No Printed Specification Available
8374X
I. Wiseman,
Water Filter,
Patented Aug. 20, 1834.
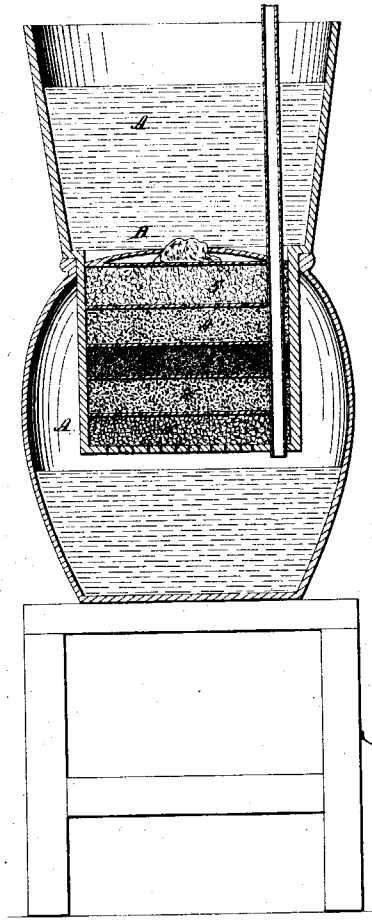
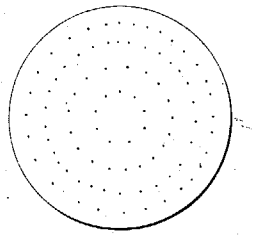
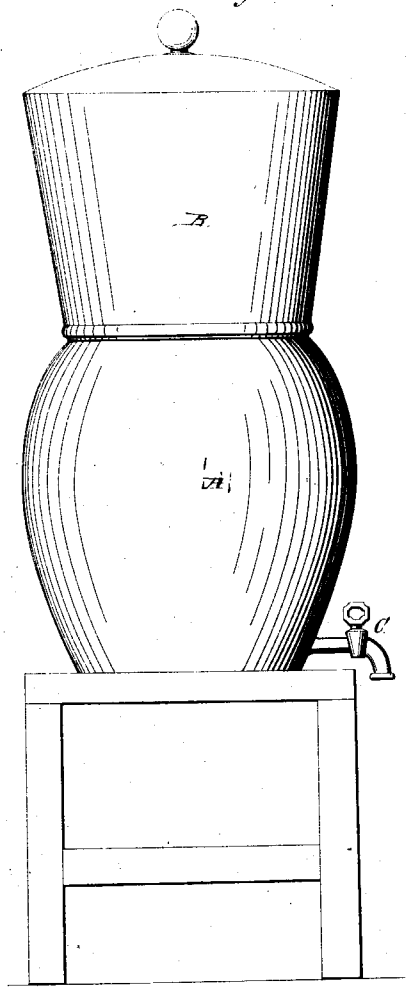

8374X Isaac Wiseman. — New York

Letters Patent.

The Schedule, referred to in these Letters Patent and making part of the same, containing a description in the words of the said Isaac Wiseman himself of his improvement in filtering machines for purifying water.

To all to whom these presents shall come.
Be it known, that I, Isaac Wiseman, of the City, County and State of New York, have invented a new and useful improvement on the art, machine or Manufacture, of making Filtering Machines for purifying water, and that the following is a full and exact description of my said improvement. Whereas, the usual mode of making Filtering Machines, for purifying Water, being very defective, from the very nature of their usual construction, have induced the undersigned to investigate the means by which the faults may be remedied, the Machine simplified and rendered more generally useful. The importance of [illegible] pure water for the use of families is of such acknowledged importance, that to dwell upon the subject would be merely a waste of time, suffice it to say, therefore, that throughout most of the southern and western States of the union, the water is of that character, that it is absolutely necessary that it should undergo some process, previous to its being used as a beverage and the object of the undersigned, is to make this process very simple, by furnishing a portable filter, that will purify and render of chrystalline brilliancy, water, that was previously, even of a stagnant character, and of course full of deleterious substances and impurities. The great defect in all water filters, is that the reservoir or chamber that contains the filtered water, cannot be got at, or be cleansed, without taking the filter to pieces, and thus disarranging all the parts. The french and english filters, as well as those made in this country, consist

8374X consist of one vessel or jar, divided into compartments, and in general, the lower part of the jar, or vessel, contains the purified water; but let the filtering media be ever so perfect, a sediment will be deposited at the bottom; and this sediment, as filters are at present constructed, cannot be removed, and hence the reason why the filters so soon get out of order. The Patent = taken out by Christopher Hall, of Norfolk, Virginia for filtering water by ascension, is subject to the same defect. although there are two reservoirs, and two taps; but the central reservoir (into which the purified water is admitted by the pressure of the atmosphere on the water in the lower reservoir) is carefully enclosed, & cemented, and cannot be cleansed except by taking the filter to pieces, and hence they are as inefficacious as the common filters by descension. Another great defect in all filters, is, that there is nothing to prevent the filtering media from being disarranged. and getting out of order. The media in generally consist of strata, or layers of sand, gravel & charcoal but there is not in any filters now in use, anything interposed between these layers, to prevent their intermixture, although they must suffer considerable disarrangements when subject to the motion and shaking of either land or water carriage. hence it often happens that filters are in excellent order when pur-chased, but are useless when conveyed to any distance.

To remedy these defects, and to make filtering vessels, filtering cisterns, or portable filters that shall produce pure water, from tha' which was previously impure and unfit for use I propose to construct them in the following manner, which I claim as an invention of my own; not having had any communication with any person or persons concerning the same.

The vessel that contains the filtering media, whether made of wood, earth, metal, or stone, is to be a separate vessel from that which contains the reservoir for the pure water. The vessel that contains the reservoir for pure water, is to be made 8374X
made so as to receive the filtering vessel, which latter can be
removed at pleasure, in order that the sediment that may be
deposited at the bottom of the reservoir may be removed.
The vessel that contains the filtering media, I call the filtering
vessel, and that which receives it and in which is the reser=
voir, I call the receiving vessel. The bottom of the filtering
vessel is perforated with very fine holes through which the
water in minute drops, passes into the reservoir after having
been filtered. The filtering media, consist of five distinct layers
separated from each other, by their perforated plates; which will
prevent the layers being disarranged or intermixed. by this improve
ment, a filter may be securely removed to any distance, as no
motion can alter the disposition of the filtering media. At the
bottom of the filtering vessel, I place a stratum of fine angular
pieces of quartz, granite, or silex, instead of gravel; my rea=
son is, that such a stratum will prevent the escape of any
sediment that may be brought by the descent of the water from
above, much more certain than gravel. The smallest piece
of quartz in this stratum, will be larger than the perforations in
the bottom of the filtering vessel. The stratum of quartz being
beaten down very firm, I then place over it a thin perforated plate
made of earth, stone, or metal; and on this plate I place a stratum
of fine washed sea sand; over the sand, another thin perforated
plate, and upon this, a stratum of prepared charcoal, so placed
that the water, in its passage, must pass through its separate
parts, in order that it may be purified. Over the charcoal is an
other perforated plate; upon which is another layer of sand;
then another plate upon which is a stratum of angular pieces
of quartz or granite. The upper plate which incloses the above
plates and strata, is made hollow; the lower part of which is per=
forated, and, in a circular aperture in the upper surface is placed
a piece of sponge; on and above this plate and sponge the water
that is to be filtered, is placed. The impure water passes or through

83744 through the sponge, thence through the perforations in the un-
-der surface of the upper plate, to the angular pieces of quartz
or granite, it passes thro' the portions of this stratum in such
minute parts, as to leave in the stratum, a portion of its im-
purities; in its progress thro' the sand, and charcoal, and
the other stratum, it is, when it arrives at the bottom of the
filtering vessel, deprived of all its deleterious qualities. It then
passes into the reservoir in the receiving vessel, from whence it
is drawn off in a pure state, by means of a tap. The filtering vessel
has an air pipe which passes from the top through the bottom,
to admit the pressure of the atmosphere upon the water in the
reservoir.) A filtering vessel of a cylindrical form, sixteen
inches deep. and twelve inches diameter, made upon the
above principle, will purify thirty six gallons of water in
twelve hours; and will continue to do so for three years.
The expense of a portable filter of the above dimensions with
receiving vessel and every thing complete will not exceed
five dollars, and for this sum upwards of forty thousand
gallons of pure water will be obtained.

Witnesses
Elias H. Ely
John M. Platt

Isaac Wiseman

Drawing

[1265 Words